(12) United States Patent
Beck

(10) Patent No.: US 9,571,438 B2
(45) Date of Patent: Feb. 14, 2017

(54) ENHANCED SERVICES ELECTRONIC MAIL

(71) Applicant: Bridgetree, Inc., Fort Mill, SC (US)

(72) Inventor: Mark Beck, Fort Mill, SC (US)

(73) Assignee: Bridgetree, Inc., Fort Mill, SC (US)

( * ) Notice: Subject to any disclaimer, the term of this patent is extended or adjusted under 35 U.S.C. 154(b) by 0 days.

(21) Appl. No.: 15/012,429

(22) Filed: Feb. 1, 2016

(65) Prior Publication Data

US 2016/0261539 A1 Sep. 8, 2016

Related U.S. Application Data

(63) Continuation of application No. 10/228,182, filed on Aug. 27, 2002, now abandoned.

(51) Int. Cl.
*H04L 12/58* (2006.01)
*H04L 29/12* (2006.01)
*G06Q 50/26* (2012.01)
*G06Q 50/32* (2012.01)

(52) U.S. Cl.
CPC ............ *H04L 51/20* (2013.01); *G06Q 50/26* (2013.01); *G06Q 50/32* (2013.01); *H04L 51/28* (2013.01); *H04L 61/10* (2013.01); *H04L 61/20* (2013.01); *H04L 51/066* (2013.01)

(58) Field of Classification Search
CPC ........ H04L 51/28; H04L 51/066; H04L 51/20; H04L 61/10; H04L 61/20; G06Q 50/26; G06Q 50/32
See application file for complete search history.

(56) References Cited

U.S. PATENT DOCUMENTS

| | | | | | |
|---|---|---|---|---|---|
| 5,805,810 | A | * | 9/1998 | Maxwell | G06Q 10/107 709/200 |
| 5,944,787 | A | * | 8/1999 | Zoken | G06Q 10/107 709/200 |
| 6,343,327 | B2 | * | 1/2002 | Daniels, Jr. | 709/239 |
| 6,463,354 | B1 | * | 10/2002 | Pintsov | G07B 17/0008 700/225 |
| 6,549,892 | B1 | * | 4/2003 | Sansone | G07B 17/00508 705/401 |
| 6,604,132 | B1 | * | 8/2003 | Hitt | G06Q 10/107 382/101 |

(Continued)

*Primary Examiner* — Saket K Daftuar
(74) *Attorney, Agent, or Firm* — Fiotch Even Tabin & Flannery LLP

(57) ABSTRACT

A database includes one or more physical location identifiers such as postal addresses, delivery or street addresses, or geographic coordinates. A correlator correlates electronic addresses with physical location identifiers. The correlated electronic addresses can incorporate part or all of the corresponding physical location identifier. The correlated electronic addresses can further incorporate a reference to an individual, such as a name or title, or a reference to a group of individuals, such as by name. Correlated electronic addresses allow reception of electronic communication. Services offered with electronic delivery of correspondence to correlated electronic addresses include return receipt, insured delivery, certified delivery, forwarding, non-delivery notification, and non-electronic delivery. Costs associated with operation of the electronic mail may be covered by administration of postage or when the recipient elects electronic delivery of correspondence traditionally delivered by paper mail.

4 Claims, 13 Drawing Sheets

(56) References Cited

U.S. PATENT DOCUMENTS

| | | | | |
|---|---|---|---|---|
| 6,609,653 B1* | 8/2003 | Lapstun | B42D 15/02 | 235/375 |
| 6,643,685 B1* | 11/2003 | Millard | H04L 29/12009 | 709/206 |
| 6,732,101 B1* | 5/2004 | Cook | G06Q 10/107 | |
| 6,760,752 B1* | 7/2004 | Liu | H04L 63/0428 | 709/206 |
| 7,054,886 B2* | 5/2006 | Stern | G06F 17/30864 | |
| 7,054,906 B2* | 5/2006 | Levosky | H04L 51/12 | 709/204 |
| 7,085,812 B1* | 8/2006 | Sherwood | H04L 12/5875 | 709/206 |
| 7,113,594 B2* | 9/2006 | Boneh | H04L 9/0847 | 380/277 |
| 7,116,985 B2* | 10/2006 | Wilson | H04W 64/00 | 455/456.1 |
| 7,120,927 B1* | 10/2006 | Beyda | H04L 51/28 | 709/206 |
| 7,337,130 B2* | 2/2008 | Ito | G06Q 10/107 | 705/26.35 |
| 7,356,564 B2* | 4/2008 | Hartselle | G06Q 10/107 | 370/466 |
| 7,379,543 B2* | 5/2008 | Hariri | G06Q 30/018 | 379/201.01 |
| 7,478,140 B2* | 1/2009 | King | G06Q 10/107 | 709/217 |
| 7,778,840 B2* | 8/2010 | Krause | G06Q 10/10 | 705/1.1 |
| 2001/0040370 A1* | 11/2001 | Pendergist | B42D 1/00 | 283/17 |
| 2001/0049669 A1* | 12/2001 | Ito | G06Q 10/107 | 705/401 |
| 2002/0002590 A1* | 1/2002 | King | G06Q 10/107 | 709/206 |
| 2002/0007453 A1* | 1/2002 | Nemovicher | H04L 12/5875 | 713/155 |
| 2002/0023140 A1* | 2/2002 | Hile | H04L 51/26 | 709/217 |
| 2002/0029248 A1* | 3/2002 | Cook | G06Q 10/107 | 709/206 |
| 2002/0029249 A1* | 3/2002 | Campbell | G06Q 10/107 | 709/206 |
| 2002/0046250 A1* | 4/2002 | Nassiri | H04L 12/5875 | 709/206 |
| 2002/0059142 A1* | 5/2002 | Krause | G06Q 10/10 | 705/44 |
| 2002/0059144 A1* | 5/2002 | Meffert | G06F 21/10 | 705/51 |
| 2002/0059381 A1* | 5/2002 | Cook | G06Q 10/107 | 709/206 |
| 2002/0059430 A1* | 5/2002 | Orbke | G06Q 10/107 | 709/227 |
| 2002/0103697 A1* | 8/2002 | Lockhart | G06Q 30/0235 | 705/14.35 |
| 2002/0120700 A1* | 8/2002 | Tamura | G06Q 10/107 | 709/206 |
| 2002/0126817 A1* | 9/2002 | Hariri | G06Q 30/018 | 379/201.01 |
| 2002/0152272 A1* | 10/2002 | Yairi | G06Q 10/107 | 709/206 |
| 2002/0169835 A1* | 11/2002 | Paul, Jr. | G06F 17/30876 | 709/206 |
| 2003/0018724 A1* | 1/2003 | Mathewson, II | G06Q 10/109 | 709/206 |
| 2003/0037261 A1* | 2/2003 | Meffert | G06F 21/10 | 726/5 |
| 2003/0061176 A1* | 3/2003 | Hoar | G06Q 10/0833 | 705/402 |
| 2003/0081785 A1* | 5/2003 | Boneh | H04L 9/0847 | 380/277 |
| 2003/0131060 A1* | 7/2003 | Hartselle | G06Q 10/107 | 709/206 |
| 2004/0003289 A1* | 1/2004 | Bhogal | G06F 21/6245 | 726/28 |
| 2011/0137718 A1* | 6/2011 | Scroggie | G06Q 20/12 | 705/14.23 |

* cited by examiner

ENHANCED SERVICES ELECTRONIC MAIL

RELATED APPLICATION(S)

This is a continuation of U.S. patent application Ser. No. 10/228,182, Filed Aug. 27, 2002, entitled ENHANCED SERVICES ELECTRONIC MAIL, which is incorporated by reference in its entirety herein.

FIELD OF THE INVENTION

This invention relates to methods and systems of mail delivery. More particularly, this invention relates to electronic mail delivery.

BACKGROUND

Traditionally, First Class and other classes of mail delivery by the United States Postal Service has provided services and options which have been invaluable and necessary for business and public use. First Class mail and other class mail features and options presently include forwarding (redirecting mail that is addressed to a no longer valid address to an updated address), return (returning to the sender mail that is addressed to a no longer valid address), certification (providing a return receipt and maintaining a record of delivery at the delivering post office), registration (monitoring of mail during transit and creation of receipts created to document the location of the mail at various stages in delivery), insurance (in case of loss), priority delivery (delivery within two days), delivery confirmation, and security (as provided by law and the Postal Inspector). The United States Postal Service ("USPS") has, through First Class mail delivery, maintained sufficient reliability and independence from influence to be relied on for business and legal matters. Courts of law, for example, consider return receipts as proof that the intended recipient received a correspondence. For this reason, businesses have traditionally utilized First Class mail for delivery of bills, invoices, and so forth. In certain situations, First Class mail is required. For example, many times mailers don't have a choice regardless of the service due to a legal monopoly—certain items, based on their purpose or content, must by law be sent by First Class mail. Examples vary from jurisdiction to jurisdiction but are often such things as statements of indebtedness, notices to creditors, notices to debtors, notices of liquidation, and so forth.

With the advent of the Internet, however, the speed, convenience, cost and benefits of access from almost any location have taken a toll on First Class and other classes of mail delivery. Many people, for both personal and business actions, are increasingly utilizing email instead of paper mail for many purposes. Even uses that would normally require the features of First Class mail, such as invoices or bills of indebtedness (return receipts or certification of deliveries are helpful when a later lawsuit is required for collection) are sometimes being delivered currently via email. Without First Class features such as forwarding and return receipt, change of address, delivery confirmation and security (via governing law and postal inspectors) increasing use by society and businesses of email as a preferred delivery channel will result in degraded benefits such as an overall lowering of reliability and documentation.

DETAILED DESCRIPTION OF THE INVENTION

The present invention encompasses the electronic delivery of communications from a sending entity to a receiving entity where the electronic delivery is able to implement any features presently available for First Class regular mail delivery. In one embodiment, the delivery of communications is electronic and can take the form of email. In other embodiments, the final delivery of communications can take alternate form such as delivery by facsimile or regular mail.

Figure 1:
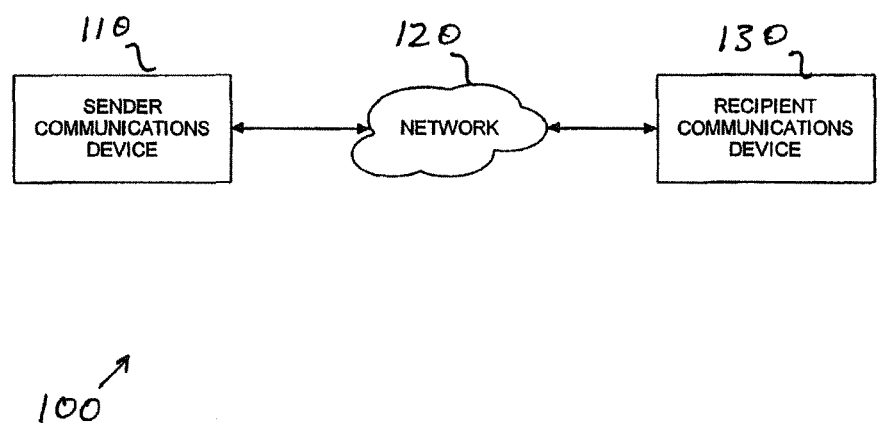
FIG. 1 shows a general block diagram of a system in accordance with an embodiment of the invention.

FIG. 1 shows a communications system (100) that enables delivery of electronic communications between two or more users. A first user, desiring to communicate to a second user, initiates the communication by using a sender communications device (110) to send a communication to a network (120). The sender communications device (110) can be any device capable of initiating a communication through a telecommunications network such as, but not limited to, a computing device (such as a computer, a notebook computer, a workstation, or a computer network), a fax machine, a personal digital assistant ("PDA"), or a cellular telephone. The network (120) comprises a network capable of transmitting communications and can include the Internet, telecommunication networks, local area networks, wide area networks, Bluetooth links, optical links, links over power lines or electric wiring, radio links, satellite links, and so on. The communication can take any suitable form such as, but not limited to, electronic mail, file transfers, and so on. In one embodiment, the communication is by electronic mail implemented by any suitable protocol such as POP3 (Post Office Protocol 3) or IMAP4 (Internet Message Access Protocol 4).

From the network (120), the message is communicated to the second user by delivery to a recipient communications device (130) from which the recipient user can access the communication. The recipient communications device (130) can be any device such as described for the sender communications device (110). The sender communications device (110) and the recipient communications device (130) do not have to be identical.

The sending of the communication from the network (120) to the recipient communications device (130) can be done in a variety of ways. In one embodiment, the communication resides in the network (120), stored in a server or other computing storage device, until the communication is requested or accessed from the recipient communications device (130). Email accounts which users access at their will are one example of this type of message delivery. In another embodiment, the communication is delivered to the recipient communications device (130) directly. Examples of this form of delivery include cellular phones that store voice messages when not answered, instant messaging over the Internet, and facsimile transmissions.

These embodiments encompass the delivery of electronic communications and facilitates this through electronic addresses which, in one embodiment, are correlated to physical addresses. As used herein, the term physical address refers to any way of describing the location of people, businesses, properties, buildings, or other facilities or physical locations and includes, but is not limited to, all valid postal addresses, street addresses, latitude and longitude coordinates, delivery addresses on seagoing vessels, and so forth.

Figure 2:
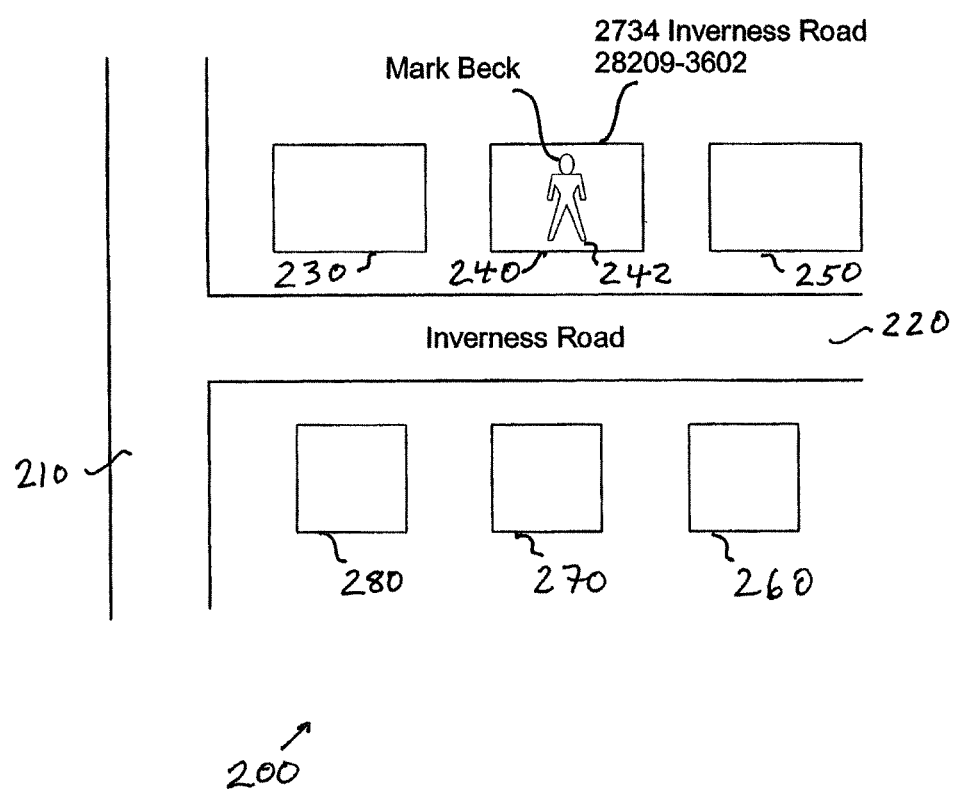
FIG. 2 shows an abstracted plan view of a generic street and buildings with occupants in accord with prior art practice.

FIG. 2 shows an abstracted aerial view (200) of a generic street. Shown are two streets (210 and 220), various buildings (230, 240, 250, 260, 270, and 280) situated along Inverness Road (220), and a person (242) named Mark Beck associated with the building (240) at 2734 Inverness Road, 28209-3602.

As used herein, the term "association" means that a person has some form of connection with the building, property, or other facility having a physical address. Such a connection can be any of a variety of situations such as, but not limited to, residing at, employed or working at, owner of, maintaining a post office box at, and so forth.

Traditionally, communication directed to an entity, such as a person or business, associated with a building such as the building (240) located at 2734 Inverness Road can take various forms. The most traditional form is a physical delivery of a written communication. For example, in order to send a communication to a person residing in apartment 3 at 2734 Inverness Road, a written communication is addressed generally with three components: (1) the street address of the building (2734 Inverness Road, 28209-3602) including (within the U.S.) a municipality or city name and a state or commonwealth name (Charlotte, N.C.), (2) an internal building address if required (Apt. 3), and (3) the intended recipient's name (Mark Beck). Generic delivery, such as use of "occupant" or "owner" instead of a specific individual's name has also traditionally been used.

The present invention encompasses the provision of First Class and other mail class features in the electronic delivery of communications to electronic accounts. These electronic accounts are defined by electronic addresses. In one embodiment, these electronic addresses incorporate at least part of a physical address of a building or property (such as a postal address, street address, or other physical identification). In a preferred embodiment, the electronic address incorporates the corresponding postal address in a format similar to how it would appear on a First Class mail envelope. For example, an electronic mail addressed to Mark Beck (242) who resides in Apt. 3 at the building (240) at 2734 Inverness Road could take a form such as Mark_Beck_Apt..sub.--3-2734Inverness_Road_Charlotte_N.C.sub.--282093602@domain.com. This example format is only one of many that are possible for use with the present invention. Obviously, significant variations from this form are possible such as, but not limited to, removal of the spaces between the address elements, reordering of various address elements, alternative use of abbreviations, use of partial addresses or names, addition of further elements, and so on. The domain used (domain.com) will vary as required by the entity providing the electronic delivery service. In one embodiment, First Class electronic delivery would be provided by the United States Postal Service and a likely domain name would be usps.com.

Generic delivery is also encompassed by the present invention. Deliveries to "occupant", "owner", or any other such designation can be implemented by substituting the generic designation in place of a specific name. Alternatively, the name can be simply left off, thus the generic delivery electronic address, in one embodiment, would only reflect the building or property address, and, if desired, an internal address such as in 2734_Inverness_Road_Charlotte_N.C.sub.--282093602@domain.com. Generic delivery is useful in a wide variety of situations such as communicating with the owner or head resident at a location. Generic delivery thus has the benefit that one mailing is done to each address and there is little undelivered mail.

In a preferred embodiment, the present invention would be implemented by the United States Postal Service and would provide protection against those who would abuse electronic delivery. Abuses of electronic delivery include, but are not limited to, such scams as fraud, pornography, etc. In this embodiment, as with regular USPS mail, the Postal Inspectors would have jurisdiction to enforce existing laws. This feature is very attractive to some parents who are trying to shield children from inappropriate emails. An additional benefit would be a reduction in what is called "spam email." With the system of the present invention, spam correspondence is likely to be reduced as a result of the postage requirements.

Providing First Class and other class electronic mail delivery according to the present invention requires that the necessary electronic addresses and associated accounts be set up. Creating an electronic address for a physical address such as a postal address or street address is referred to as correlation. In order to do this, for generic delivery, an account and email address must be set up for each building or property desired. Additionally, in many instances, there will need to be multiple electronic addresses set up for one building or property. This will be desirable when multiple delivery sites exist at the building or property such as multiple internal addresses in a building (a likely occurrence with buildings having offices, suites, apartments, condominiums, and so on).

In one embodiment, the present invention is applied over a defined set of locations (geographical addresses, buildings, properties, or other facilities) and at least one electronic address is created for each building, property, or facility. While generally, defining sets of locations which are contiguous is the norm, non-contiguous sets of locations can be defined.

Figure 3:
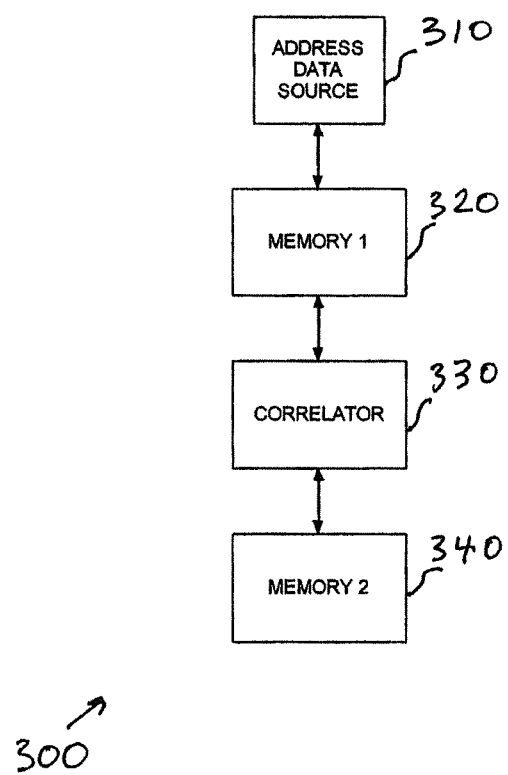
FIG. 3 shows a block diagram for a system for correlating geographical addresses and email addresses according to one embodiment of the present invention.

FIG. 3 shows a block diagram for a system (300) for correlating geographical addresses and email addresses according to one embodiment of the present invention. In order for the system to produce electronic addresses, the system requires an address data source (310). The address data source (310) can be external to the system (300) and can be any source such as a commercial, governmental, or private database or other source of physical address information. Physical address information is data that contains physical addresses. As defined in reference to FIG. 2, physical addresses include such things as postal addresses, street addresses, and latitude and longitude coordinates defining the location of pieces of property or buildings, and so forth. In a preferred embodiment, the address data source (310) comprises the residential and business address databases of the United States Postal Service.

When system (300) receives address information, it stores this information in a memory 1 (320). Memory 1 (320) can be any form of memory such as, but not limited to, an electronic database, a harddrive, a floppy drive, integrated circuit memory (such as DRAM, SRAM, etc.), a CDROM, and so forth. In one embodiment, the memory 1 (320) is a combination of a harddrive and system memory incorporated as part of a computer system or server. The data stored in the memory 1 (320) is accessed by a correlator (330) that extracts address information for a specific property, building, or other facility and correlates with this address a unique email address. The correlator (330) executes the procedures necessary to correlate electronic addresses to physical address information stored in the memory 1 (320). The correlator (330) can comprise any hardware device capable of carrying out this processing including, but not being limited to, a microprocessor or application-specific integrated circuit (ASIC). The unique email address for a given specific property, building, or other facility can be generated externally from the correlator (330) or as part of the processing in the correlator (330).

In one embodiment, the correlator (330) generates the unique email addresses itself. In another embodiment, randomly-generated or user-defined electronic addresses generated randomly are used. The entity that generates the unique email addresses, the method used to generate the unique email addresses, and the predictability of the unique email addresses from the corresponding property, building, or facility address is a function of the specific characteristics of the desired use to which the system (300) will be put. As discussed previously in reference to FIG. 2, each unique email address is generated to incorporate at least a portion of the physical address of the corresponding property, building, or facility. For example, given a building with the postal address of 123 Mea Culpa Street, Arlington, Va., 22202, possible email addresses include: 123meaculpastreet@arlingtonva.usps.com and 123_mea.sub.13culpa_street_arlington_va@USPS.com.

Once the correlator (330) correlates a unique email address with the physical address for a property, building, or other facility, the correlator (330) stores this correlation in a memory 2 (340). The memory 2 (340) can be any suitable device such as an electronic database, a harddrive, a floppy drive, integrated circuit memory (such as DRAM, SRAM, etc.), a CDROM, and so forth. In one embodiment, the correlator (330) stores this information into a database in memory 2 (340).

Figure 4:
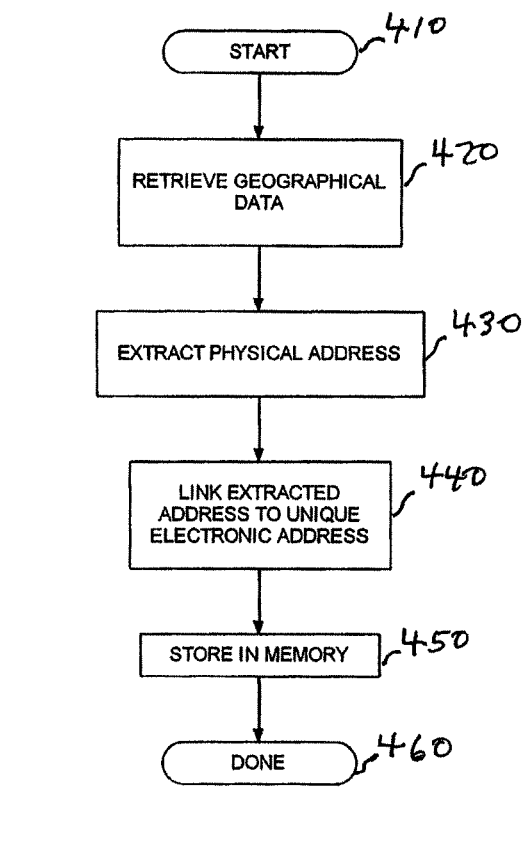
FIG. 4 shows a flowchart of one method of correlating addresses according to an embodiment of the present invention.

FIG. 4 shows a flowchart of an exemplary algorithm (400) for correlating addresses according to an embodiment of the present invention. In this example, the algorithm (400) executes in the correlator (330). The algorithm begins (410) by retrieving (420) geographical or address data from memory 1 (320). The algorithm then extracts (430), if necessary, the actual address from the retrieved data. The extraction process may not be necessary if the geographical data stored in the memory 1 (320) is stored in an appropriate format. If the geographical data is not in an appropriate format, has extraneous information, or is in some way incomplete, then the algorithm (400) corrects this at the extraction step (430). After extracting a physical address, it is correlated (440) with a corresponding electronic address.

The electronic address selected for correlation with an extracted physical address can take any form desired including, but not limited to, randomly-generated, user-selected, predetermined, or address-dependent. In one embodiment, as discussed in reference to FIG. 2, the electronic address generated for correlation with an extracted physical address would incorporate at least part of a physical address is a way similar to the way the physical address would appear on a paper envelope or package for regular mail delivery to the physical address.

Delivery of mail to a predetermined person at an address is generally more common than generic mail delivery to an address (i.e. delivery without specification of any recipient person by name). In some situations, however, physical address information will be known about a building or property without any information concerning any people associated with the building or property. In one embodiment suitable for executing on the system of FIG. 3, the correlator (320) creates electronic addresses that incorporate at least part of their corresponding physical address. The correlator (230) is thus only able to generate either a base electronic address or a generic electronic address. A base electronic address corresponds only to the physical address of the building or property and does not contain any generic addressee or specified addressee. A base address, however, can be augmented later with the name of a person to create a specific correlated electronic address.

Once an electronic address has been selected or created for the physical address, it is stored (450) in memory such as the memory 2 (340). Generally, the storage will take the form of a database but can be as simple as a listing of the electronic addresses, providing the proper electronic address for a given physical address can be determined easily. A typical form for the storage of the correlated electronic addresses would be a lookup table associating physical addresses with their corresponding correlated electronic address.

Figure 5:
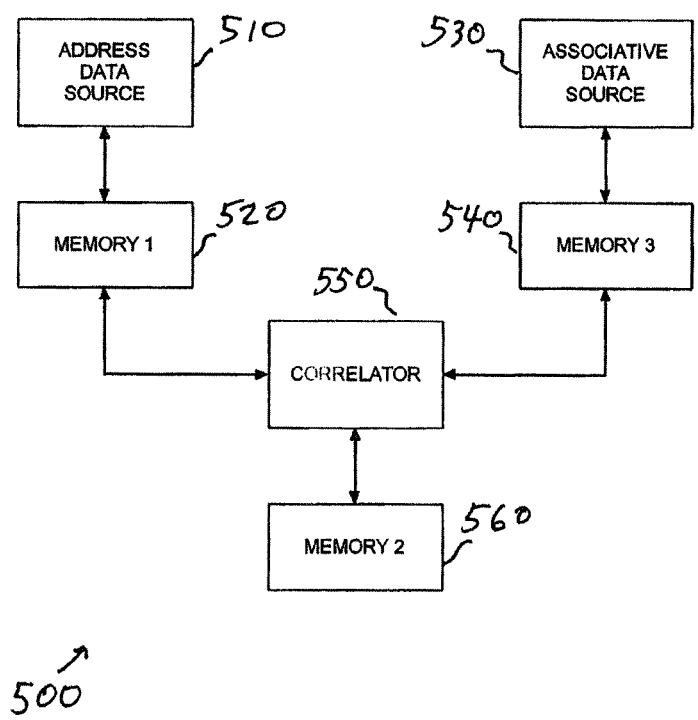
FIG. 5 shows a block diagram of a system for correlating geographical addresses and email addresses using associative data according to one embodiment of the present invention.

FIG. 5 shows a block diagram of a system (500) for correlating geographical addresses and email addresses using associative data according to one embodiment of the present invention. This system is similar to that of FIG. 3 but accommodates data associating people with buildings or properties such as Mark Beck (242) as shown in FIG. 2. An address data source (510) provides the geographic address data and can comprise the same things as the address data source (320) discussed in reference to FIG. 3. The address data source (510) is coupled to a memory 1 (520) and stores geographic data as it is received by the system (500). The memory 1 (520) can comprise the same things as memory 1 (330) discussed in reference to FIG. 3. An associative data source (530) is coupled to a memory 3 (540). The associative data source (530) can be external to the system (500) and can be any source such as a commercial (for example financial data or direct marketing data), governmental, or private database or other source of associative information. Associative data is data that provides an association between one or more people and physical address information. Generally, the nature of the association is also provided by the associative data source (530).

The memory 1 (520) and the memory 3 (540) are both coupled to a correlator (550). The correlator (550) carries out correlation of electronic addresses with physical addresses in a way similar to that of the correlator (330) as described in reference to FIG. 3. However, this correlator (550) correlates a physical building or property address with an electronic address that incorporates both the physical address and the name of a person associated with the address. The correlator (550) stores correlated electronic addresses into a memory 2 (560). The memory 2 (560) can be any form of memory such as, but not limited to, an electronic database, a harddrive, a floppy drive, integrated circuit memory (such as DRAM, SRAM, etc.), a CDROM, and so forth.

Figure 6:
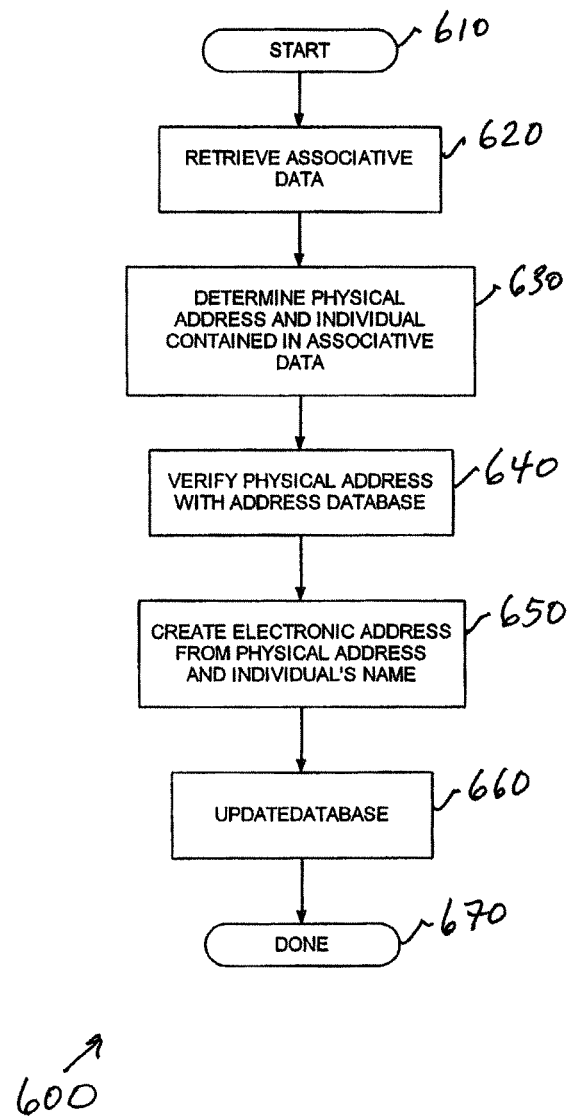
FIG. 6 shows a flowchart of a method of correlating addresses utilizing associative data according to an embodiment of the present invention.

FIG. 6 shows a flowchart of an exemplary algorithm (600) for correlating addresses utilizing associative data according to an embodiment of the present invention. The algorithm (600) is suitable for execution on the correlator (550) of FIG. 5. The algorithm (600) begins (610) by retrieving (620) associative data from the memory 3 (540) shown in FIG. 5. The associative data will identify one or more people who are associated with a building or property physical address. From this associative data, the algorithm (600) extracts (630) the names of the person or people and the physical address information. Depending on the original source for the associative data, address information might be incomplete or in a non-standard form. In order to verify that the address data is correct, the algorithm (600) then verifies (640) the retrieved address with the address information contained in the memory 1 (520) shown in FIG. 5. Once the address information is verified to be a valid address, an email address is selected or created (650) for the verified address and associated person or people. In one embodiment, the electronic addresses are created and a created electronic address includes at least part of a person's name and at least part of the physical address, complete with an internal address if available set out in a standard format. An example of this already discussed is the created address Mark_Beck_Apt..sub.--3.sub.--2734_Inverness_Road_Charlotte_N.C.sub-.--282093602@domain.com.

Multiple addressee electronic addresses can also be created. Such electronic addresses can provide multiple people with communications and are very convenient when their use is desirable. The format for creating such multiple addressee electronic addresses can be to incorporate the names, or truncated versions thereof, into the electronic address. An alternative way is to provide the group of people involved with a collective term. An example of such a created electronic address could be Beck.sub.13family.sub.--3104_Annry_Drive_Sunmmerfield_N.C.sub.--282093602@_USPS.com.

Once an electronic address is created for a set of associative data, it is stored (660) in memory such as the memory 2 (560). As with the step (460) of the algorithm (400), the step (660), in one embodiment, stores electronic addresses in relation to their corresponding physical addresses for efficient look up.

Figure 7:
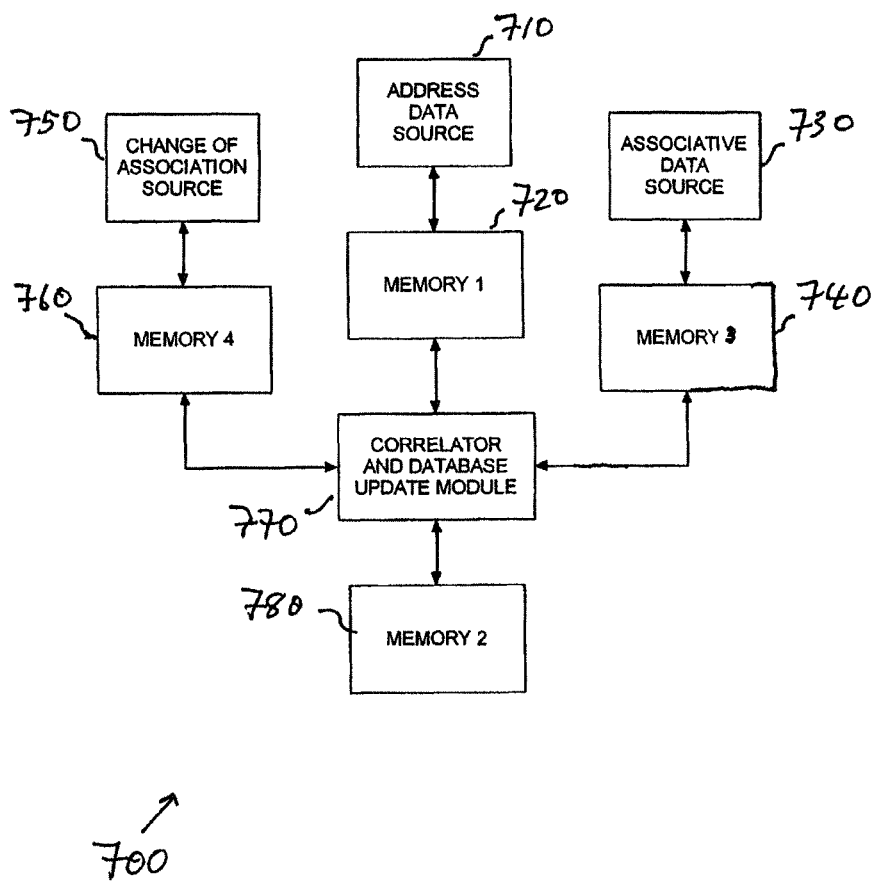
FIG. 7 shows a block diagram of a system for dynamically updating a correlated email address system according to an embodiment of the present invention.

FIG. 7 shows a block diagram of a system (700) for updating a correlated email address system according to an embodiment of the present invention. The system (700) includes an address data source (710) coupled to a memory 1 (720) that are identical to the address data source (310) and the memory 1 (320) discussed in reference to FIG. 3, respectively. The system (700) also includes an associative data source (730) coupled to a memory 3 (740) that are identical to the associative data source (530) and the memory 3 (540) discussed in reference to FIG. 5, respectively. The memory 1 (720) and memory 3 (740) are coupled to a correlator and database update module (770) that is coupled in turn to a memory 2 (780). The correlator and database update module (770) and memory 2 (780) parallel the correlator (330) and memory 2 (340) discussed in reference to FIG. 3 although the correlator and database update module (770) carries out additional processing not necessary in correlator (330) of FIG. 3. The correlator and database update module (770) can comprise any hardware device capable of carrying out this processing including, but not being limited to, a microprocessor or application-specific integrated circuit (ASIC).

The system (700) also includes a change of association source (750) coupled to a memory 4 (760). Change of association information refers to information which provides updates or corrections resulting from the changing of an existing association between a person and a property or building or the creation of a new association between a person and a building or property. Typical situations that result in a change of association are people changing residence, people changing jobs, and so forth. The change of association source (750) can be external to the system (700) and can be any source such as a commercial (for example financial data or direct marketing data), governmental, or private database or other source of change of associative information. In one embodiment, the change of association source (750) is the USPS change of address database.

The change of association source (750) is coupled to a memory 4 (760) that stores the change of association information for the system (700) upon receipt. The memory 4 (760) can be any form of memory such as, but not limited to, an electronic database, a harddrive, a floppy drive, integrated circuit memory (such as DRAM, SRAM, etc.), a CDROM, and so forth.

The memory 4 (760) is coupled to the correlator and database update module (770) that is also coupled to the memory 2 (780). The correlator and database update module (770) retrieves the change of association data from the memory 4 (760) and uses this data to update the stored correlated electronic addresses stored in the memory 2 (680).

Figure 8:
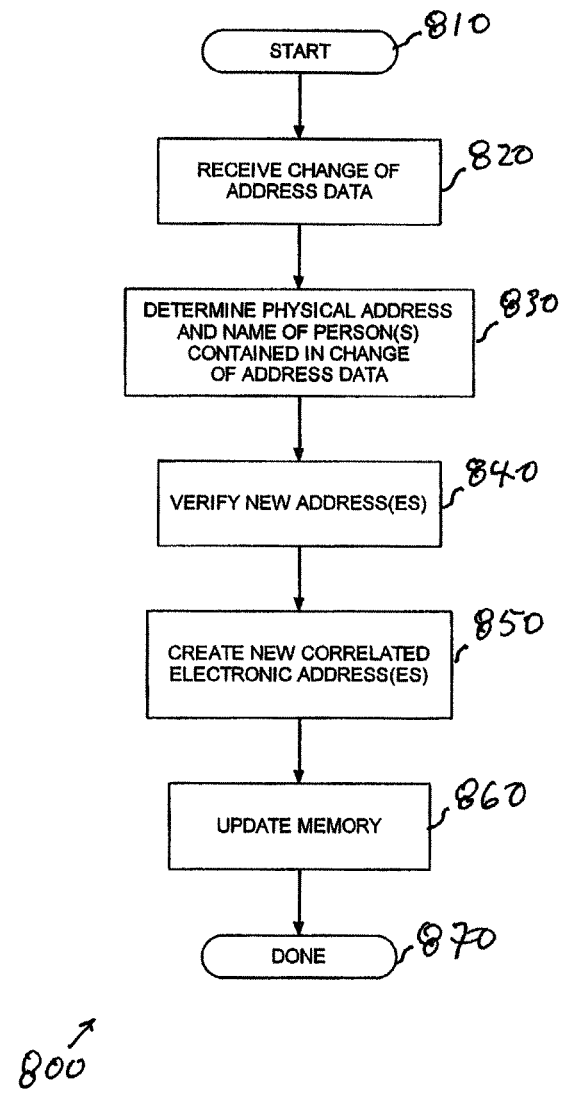
FIG. 8 shows a flowchart of a method for updating correlated addresses according to an embodiment of the present invention.

FIG. 8 shows a flowchart of an exemplary algorithm (800) for updating correlated addresses for execution in the correlator and database update module (770) of the system of FIG. 7. The algorithm (800) begins (810) by retrieving (820) change of association data from the memory 4 (760). From this data, the algorithm (800) determines (830) the names of the people and physical addresses involved as well as the nature of the change. Any new physical addresses involved are checked (840) to verify that they are valid and in standard format and a new correlated electronic address is created (850). Once any necessary new electronic addresses are created, the stored database is updated (860). Updating of the database will generally involve at least adding a new correlated electronic address but may also require that something be done with the old correlated address. If the change of association data indicates that forwarding of electronic correspondence is desired, the database is updated correspondingly. Alternatively, if forwarding is not requested, the old correlated electronic address can be deleted, marked as inactive, or whatever is appropriate.

Figure 9:
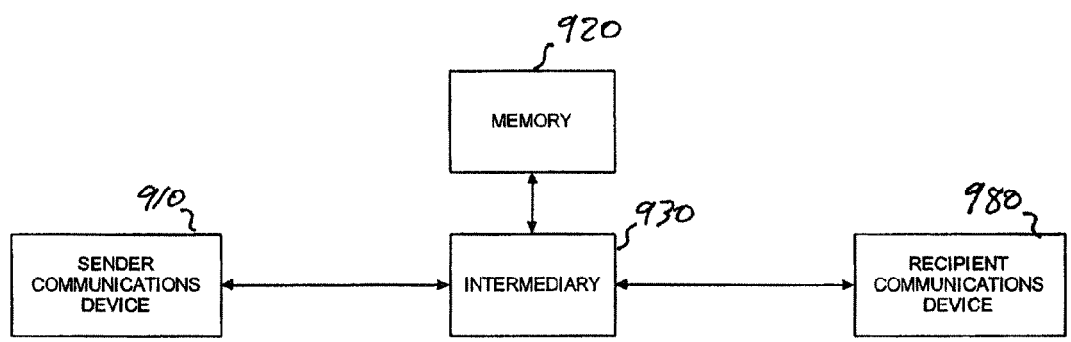
FIG. 9 shows a block diagram of a system for delivering first class or other class email according to an embodiment of the present invention.

FIG. 9 shows a block diagram of a system (900) for delivering first class email according to an embodiment of the present invention. In the system (900), a user communications device (910) represents a device that is originating a communication. The user communications device (910) can be any device capable of interacting with an electronic network such as, but not limited to, a personal computer, a personal digital assistant, a cellular telephone, and so on. The user communications device (910) is coupled to an intermediary (930). The intermediary (930) generally resides on, or is connected to, the network to which the user communications device (910) is coupled. The intermediary (930) can be any device capable of receiving communications and processing them such as, but not limited to, a computing device such as a network server. The intermediary (930) is coupled to a memory (920). The memory (920) can be any form of memory such as, but not limited to, an electronic database, a harddrive, a floppy drive, integrated circuit memory (such as DRAM, SRAM, etc.), a CDROM, and so forth. The memory (920) contains correlated electronic addresses. For example, the memory (920) could be the memory 2 (340), the memory 2 (560), or the memory 2 (780). The intermediary (930) serves to verify that a message is properly addressed to a valid recipient and address and that the proper electronic postage, if required, is paid.

The intermediary (930) is also coupled to a recipient communications device (980). The recipient communications device (980) can be any device capable of interacting with an electronic network such as any of the devices listed in the discussion of the user communications device (910). Additionally, the recipient communications device (980) could be any device capable of interacting with an electronic network even if it is only able to receive communication messages and not originate them.

Figure 10:
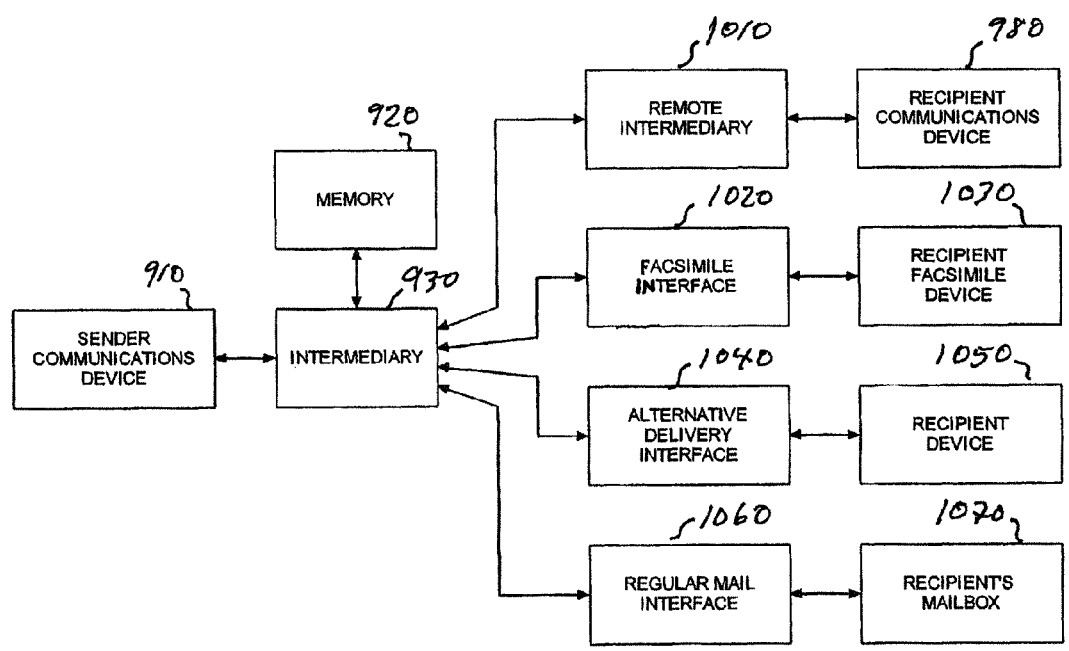
FIG. 10 shows a block diagram of a system for alternative delivery of first class email according to an embodiment of the present invention.

FIG. 10 shows a block diagram of a system (1000) for alternative delivery of First Class electronic mail according to an embodiment of the present invention. The system (1000) is identical to the system (900) described above except that this system (1000) shows those system components that operate when an electronic communication is not directly deliverable via the electronic address set up for the recipient. One use for these alternative delivery mechanisms is when the electronic delivery system, or the recipient communication device (980) is inoperable. Another use for alternative delivery, however, is simply when the recipient has indicated that he or she does not want to receive communications through the correlated electronic address set up for him or her. While the reasons for this may be personal, recipients may elect to not receive communications through their electronic addresses in cases where they do not have access to a suitable recipient communications device (980). In cases where intended recipients do not opt for receiving electronic communications via the electronic address, the opportunity is available for them to opt for a preferred alternative delivery method. Delivery can still be accomplished even when intended recipients do not opt for electronic delivery and do not provide for alternative delivery methods. In these cases, delivery can be accomplished via regular mail.

In this system (1000), the user communications device (910), the intermediary (930), and the memory (920) are identical and coupled in the same manner as discussed in reference to FIG. 9. In this system (1000), however, the intermediary (930) is coupled to various subsystems that facilitate alternative delivery methods including remote electronic delivery, facsimile delivery, and delivery by regular mail.

For various reasons, such as large geographic extent, political or legal jurisdictions, differing ownership by business entities, and so forth governing the implementation of the present invention, there may be multiple intermediaries in the system (1000). Such systems are termed distributed. In general in such systems, each user will have an intermediary that is local to him or her. Communications from a sender to a recipient each having a different local intermediary thus requires remote electronic delivery. To enable remote electronic delivery, the intermediary (930) is coupled to a remote intermediary (1010) that in turn is coupled to a recipient communications device (980). While the connection between intermediary (930) and remote intermediary (1010) is shown as only a network connection, larger implementations may require one or more intermediate intermediaries in between intermediary (930) and the remote intermediary (1010).

The intermediary (930) is also coupled to a facsimile interface (950) that in turn is coupled to a recipient facsimile device (1030). The facsimile interface (950) can be any device capable of interfacing with the system (1000) in order to communicate by facsimile transmission to the recipient facsimile device (1030). In one embodiment, however, in order to deliver communications by facsimile the intended recipient must have opted to receive communications by facsimile and, of course, supplied a valid facsimile number. As delivery according to the present invention encompasses various First Class features, use of facsimile delivery as an alternative delivery method is only an option where the facsimile delivery can implement all of the delivery features required by the sender. Thus, while normal facsimile delivery is available for delivery of communications for which no First Class features have been opted, delivery of communications for which First Class options have been chosen may not be available in all cases. In order to provide more options for users, the present invention encompasses facsimile machines that require the end recipient to provide a signature before receiving a facsimile transmission. Such a system can operate by the sending facsimile machine contacting the intended recipient's facsimile machine and first indicating that a facsimile is to be sent. The recipient's facsimile machine will then notify the recipient that a facsimile is pending and request a signature. In one embodiment, the recipient's facsimile machine would receive the facsimile, perhaps in encrypted form, but not print it until a suitable signature is provided which the facsimile machine then transmits to the originating facsimile machine. Similarly, the First Class options of delivery certification and insurance can be easily implemented as facsimile machines do have the ability to confirm whether the receiving facsimile machine received the sent document or not.

The intermediary (930) is also coupled to a regular mail interface (1060) which in turn is coupled to a recipient's mailbox (1070) for delivery of communications by regular mail. The regular mail interface (1060) can be anything capable of converting an electronic communication into a physical communication such as a letter for later delivery. Devices and methods of converting email or other electronic communications into paper or mail pieces for delivery are well-known. In a preferred embodiment, the converting device or method used preserves any First Class features (such as return receipt, insurance, etc.) that the sender has opted for. The coupling between the regular mail interface (1060) and the recipient's mailbox (1090) represents delivery by carrier and could include delivery by UPS, Federal Express, or the United States Postal Service. In a preferred embodiment delivery would be by the United States Postal Service.

In normal operation, regular mail delivery is available for most people and entities. As such, no permission is required for delivery by regular mail. Regular mail delivery is thus the default alternative delivery method and is available for any intended recipient who has not opted for electronic delivery and who has not specified a preferred alternative delivery method.

As First Class regular mail obviously implements all of the First Class options, these options are available when regular mail is used as an alternative delivery method. Use of the regular mail as an alternative delivery method may require additional postage or postage authorization from the sender, however.

The intermediary (930) is additionally coupled to an alternative delivery interface (1040) which in turn, is coupled to a recipient device (1050). This delivery system encompasses any alternative delivery system other than facsimile or regular mail delivery and includes human or automated oral delivery by telephone, telegrams, messenger delivery, or less direct methods such as notice or ad placement in newspapers, magazines, other publications, or media such as radio or television. The alternative delivery interface (1040) interfaces with the system (1000) to convert electronic communications into suitable format for delivery in the alternative delivery system. Accordingly, the recipient device (1050) is any device sufficient to enable the intended recipient to receive and access the delivered communication.

As with regular mail delivery and facsimile delivery as alternative delivery methods, any other alternative delivery method can only be used when the delivery options selected by the sender can be implemented in the alternative delivery method, and where sufficient postage is available to cover any additional costs.

Figure 11:
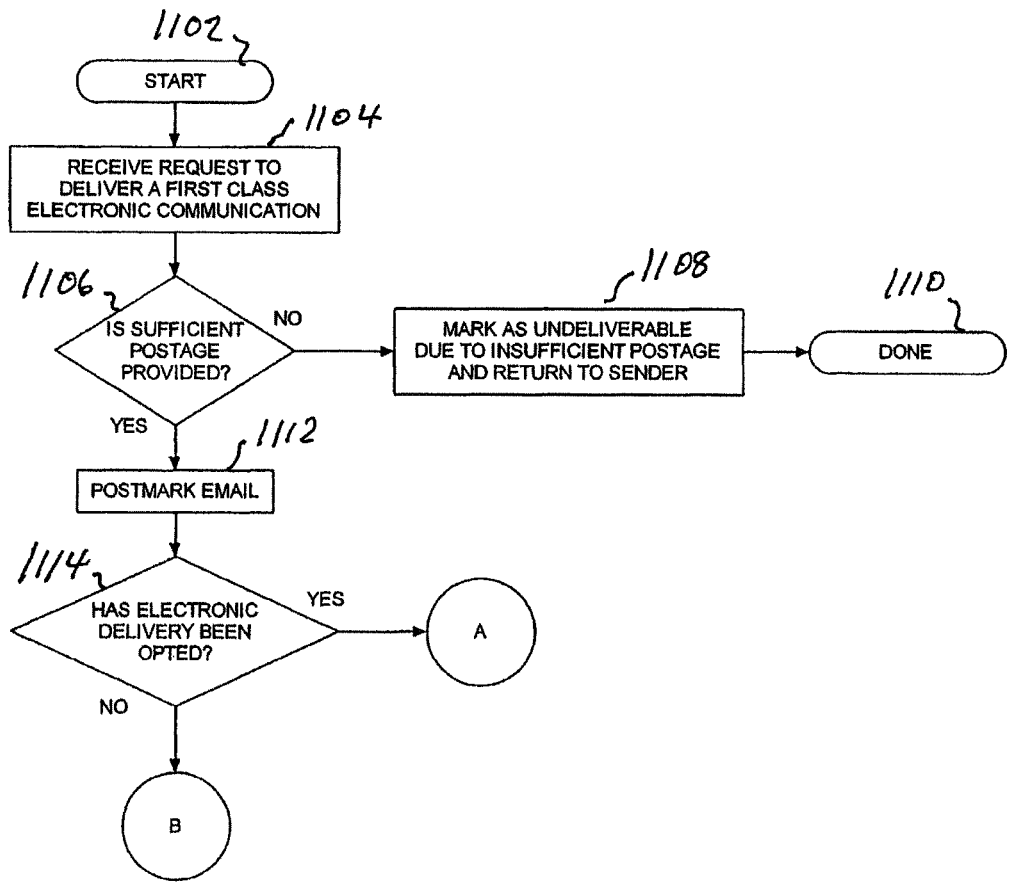
FIGS. 11-13 show a flowchart of an exemplary algorithm implementing an embodiment of the present invention. herein.
Figure 12:
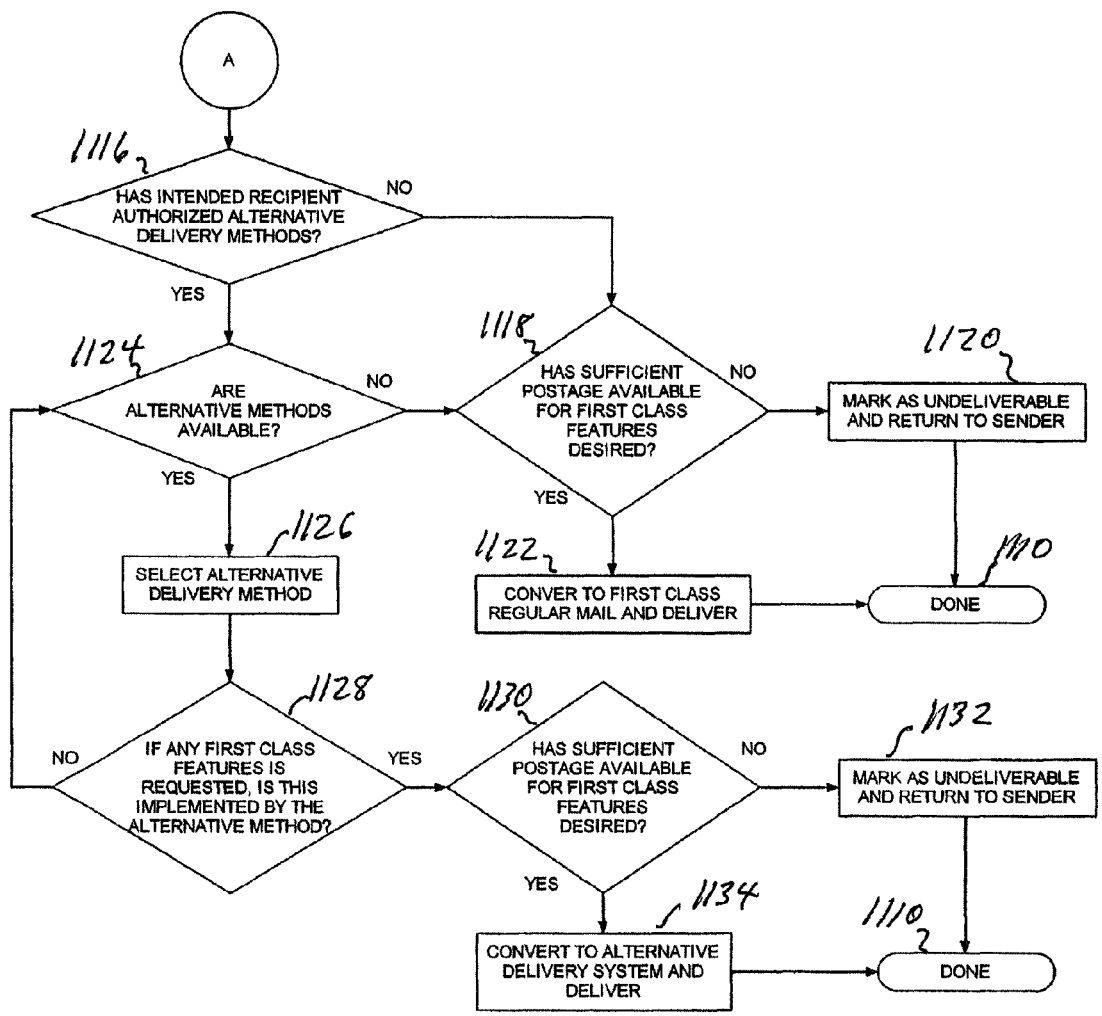
Figure 13:
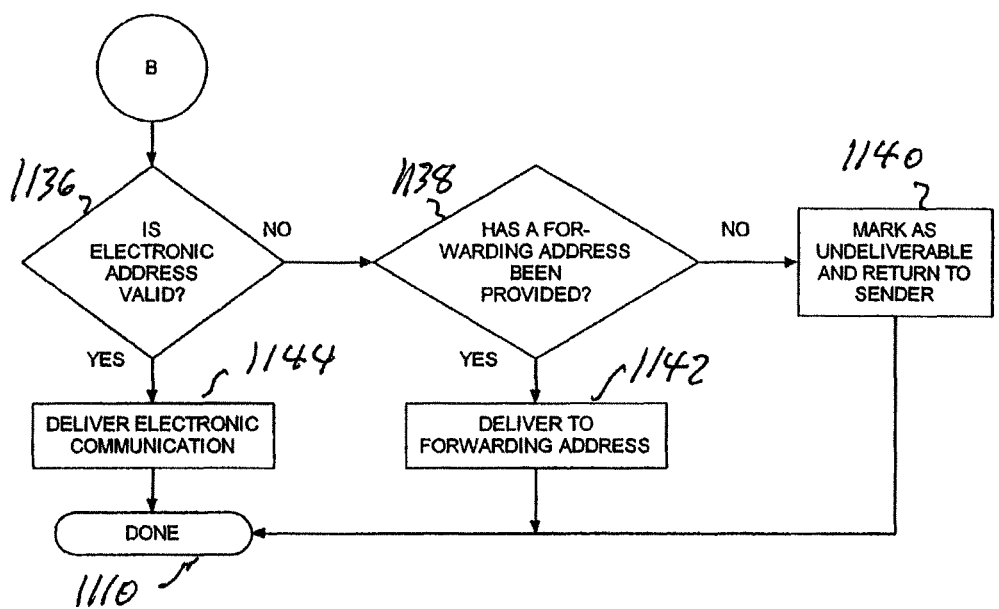

FIGS. 11-13 show a flowchart of an exemplary algorithm (1100) for executing in the systems of FIGS. 9 and 10. The algorithm (1100) begins (1102) when it receives (1104) a request to deliver a First Class electronic communication. The algorithm (1100) then checks (1106) whether sufficient postage has been provided. Additionally, in one embodiment, the sender can provide authorization for the algorithm (1100) to obtain the necessary postage at the time of delivery. One way this can be done is by allowing senders who have previously set up an account to authorize debiting of the necessary postage. In an alternative embodiment, postage is not required so checking for postage at the checking step (1106) is not done. If postage is required but not submitted or authorized, the communication is marked (1108) as undeliverable and returned to the sender. Marking can be done in a variety of ways including, but not limited to, providing a header to the communication explaining that the message is undeliverable for lack of postage.

If sufficient postage has been supplied or authorized, or if no postage is required, the communication is postmarked (1112). Depending on the specific implementation of how postage payment is done, the postmarking procedure may be required to prevent reuse of the postage by the recipient. Another benefit of postmarking is that it is a form of certification that delivery was provided. After postmarking, the algorithm (1100) checks (1114) to see whether the intended recipient has opted to receive communications via the electronic address. If the intended recipient has not opted to receive electronic communications via the correlated electronic address, a check is performed (1116) to determine if the intended recipient has set forth any preferred alternative delivery methods other than regular mail. If the intended recipient has not opted for any alternative delivery methods, the communication is considered for conversion to paper format and delivery by First Class regular mail. As First Class regular mail implements all of the advanced features that are implemented by the present invention, such as return receipt or insurance, any such features elected by the sender are maintained when delivering the communication by regular mail. To do this, the communication is checked (1118) to determine if sufficient postage or authorization is present to cover any conversion and additional costs for regular mail delivery of the communication. If sufficient postage is not present or authorized, the communication is marked as undeliverable and returned (1120) to the sender. If sufficient postage or authorization is determined (1118) to be present, the communication is converted to regular mail and delivered (1122).

If, however, at the step (1116), it is determined (1116) that the intended recipient has authorized one or more non-regular mail alternative delivery methods, a check is made (1124) whether at least one opted alternative delivery method is available. If no alternative delivery method other than by regular postal mail is available, control passes to the step (1118) of determining if sufficient postage or authorization exists to deliver the communication by regular mail and continues as discussed previously.

If it is determined (1124) that one or more alternative delivery methods other than regular mail delivery has been opted, then an attempt is made to determine a suitable alternative delivery method. First, an alternative delivery method is chosen (1126) from those opted and the algorithm (1100) determines (1128) whether this alternative delivery method is available, and if so, whether all of the First Class features requested by the sender are available via the alternative delivery method. If the selected alternative delivery method is not available or does not implement the desired First Class features requested by the sender, the algorithm (1100) returns back to the step (1124) to select another alternative delivery method and continues as before.

If the selected alternative delivery method is determined (1128) to be available and able to implement all the First Class features requested by the sender, the communication is checked to determine (1130) whether sufficient postage or authorization is available to cover any additional costs of using the alternative delivery method. These additional costs may include, but are not limited to, costs of conversion to the alternative delivery method and costs of delivery in the alternative delivery method. If sufficient postage or authorization is determined (1130) not present, the communication is marked undeliverable and returned (1132) to the sender. If sufficient funds are available to cover any additional costs of delivery by the alternative delivery method, then the communication is converted to the alternative delivery format and delivered (1134).

If, however, at the step (1114), it is determined (1114) that electronic delivery has been opted by the intended recipient, the algorithm (1100) continues to step (1136) as shown in FIG. 13. The algorithm (1100) checks (1136) whether the electronic address provided by the sender is valid. An address is valid if it exists in the database and if it is current (i.e. not marked inactive as a result of a change of association or change of address request). If the electronic address is not valid, a check is made (1138) whether a forwarding address has been supplied. If no forwarding address has been supplied, the communication is marked (1140) as undeliverable and returned to the sender. If a forwarding address has been supplied, the communication is delivered to the forwarding address. Delivery to a forwarding address, in one embodiment, requires delivery to a remote transmitter or server that is part of the system executing the algorithm (1100). In one embodiment, upon receipt of the forwarded communication, the remote transmitter or server will execute a new instance of algorithm (1100) to effect further delivery processing on the communication.

If, at the step (1136), the electronic address supplied by the sender is determined (1136) to be valid, the communication is delivered (1144) to the electronic address for the recipient's review.

In addition to providing First Class mail features, the present invention encompasses extended features. Extended features provided by the present invention include, but are not limited to, reply, prepaid reply, and confirmation of access.

The reply feature allows the recipient to reply to a sender's communication. The reply feature can be carried out via regular email, as is well-known in the art, or other suitable electronic communication. Alternatively, the reply can be carried out though the electronic postal system from which the sender's communication arrived. The reply can thus be allowed either only with required postage or, alternatively, without any required postage as determined by the administrators of the electronic postal system. In the event that postage is required, the recipient would be responsible for this.

The prepaid reply feature allows the recipient to reply to a sender's communication using the electronic postal system that was used in sending the original communication, but with any required postage having been prepaid by the sender or a 3.sup.rd party. In one embodiment requiring postage for replying, the sender has the option to prepay or authorize payment to cover the recipient's reply. Such an embodiment could be useful to encourage replies.

The confirmation of access feature is easily implemented for electronically-delivered communications and reports when the communication has been accessed or opened for reading. In one embodiment, passwords can be used to indicate who accessed the communication.

In one embodiment, the present invention allows businesses, especially utilities or other businesses having regular billing requirements, to drastically reduce billing costs by saving the costs associated with printing and mailing paper bills. Businesses or utilities, already having a set of consumer addresses, are in an ideal position to implement a variant of the present invention. Such businesses can implement the present invention by providing an Internet-accessible computing device and offering consumers each a free email account at a correlated electronic address set up according to the present invention. Consumers who accept the free account would receive their bills electronically, thus saving the paper billing and associated costs.

In another embodiment, the system allows for third party payment of postage costs, for either initial senders, recipients when communicating a reply, or both. Third party coverage of postage can take several forms including, but not limited to, anonymous coverage (where the third party remains unknown to the sender and/or recipient), basic coverage (where the third party covers postage for the sender and/or recipient. An example would be governmental or business sponsored prepaid replies), subsidized coverage (where the third party subsidizes postage such as for lower income people), and advertisement-sponsored coverage.

Advertisement-sponsored coverage occurs when a third party covers the postage in exchange for advertisement exposure to the sender and/or recipient such as by pop-up windows, embedded advertisements, and so on. Pop-up windows can be presented to the sender when interacting with the system to create or send a communication and/or the recipient when interacting with the system such as to receive, read, or reply to a communication. Embedded advertisements can be used electronically instead of or in addition to pop-up windows and are simply advertisements that are or appear to be part of the user interface used by the sender when interacting with the system. Additionally, advertisements can be embedded or appear embedded in the communication and thus are exposed to the recipient when the recipient is accessing or reading the communication. When alternative delivery methods are used such as facsimile or regular postal mail, advertisements can also be embedded in the media of these communications concept.

I claim:

1. An apparatus comprising:
   a processor; and
   an email address correlator executed by the processor wherein the email address correlator executed by the processor has access to:
      physical addresses for a plurality of physical addresses wherein each of the physical addresses comprises, at least in part, geographically-based addresses that each comprise a latitude and longitude pair and at least one of a street address and a postal address for corresponding buildings;
      associative data identifying associations between various persons and specific ones of the physical addresses; and
   wherein the email address correlator executed by the processor causes the email address correlator to: automatically generate unique email addresses that each comprise at least a portion of one of the physical addresses and a name of the person who is associated with that physical address, such that the unique email addresses each include a latitude and longitude pair and at least one of a street address and a postal address; and
   provide the unique email addresses to an email transmitter to facilitate electronically delivering a message to a given person fully via email using a specific one of the unique email addresses that corresponds to the given person.

2. The apparatus of claim 1 wherein the geographically-based addresses comprises at least each of:
   a street address;
   a postal address; and
   a latitude and longitude pair.

3. The apparatus of claim 1 wherein the email address correlator executed by the processor causes the email address correlator to automatically generate the unique email addresses by utilizing a same domain name for each of the unique email addresses.

4. The apparatus of claim 1 wherein automatically generating unique email addresses that each comprise at least a portion of one of the physical addresses and a name of the person who is associated with that physical address can include automatically generating unique email addresses for each of a plurality of people who are each associated with a same physical address.

* * * * *